2,882,316
PRODUCTION OF ORGANIC PHOSPHONYL HALIDE

William E. Hanford, Short Hills, N.J., assignor to The M. W. Kellogg Company, Jersey City, N.J., a corporation of Delaware No Drawing. Application May 10, 1956
Serial No. 584,411

20 Claims. (Cl. 260—543)

This invention relates to a method for the manufacture of an organic phosphonyl halide. In one aspect the invention relates to the production of alkyl and cycloalkyl phosphonyl halides. In another more particular aspect the invention relates to the production of methane phosphonyl dichloride. This application is a continuation of my prior and copending application Serial Number 200,487, filed December 12, 1950, now abandoned.

Methane phosphonyl dichloride is a known compound and is much in demand as an intermediate chemical reactant. Prior to the present invention this compound has been produced by a devious and round about method involving numerous chemical and mechanical steps. The following equations indicate the presently proposed stepwise method for producing methane phosphonyl dichloride:

(1) $6CH_3OH + 2PCl_3 \longrightarrow 2(CH_3O)_2POH + CH_3Cl$ (2) 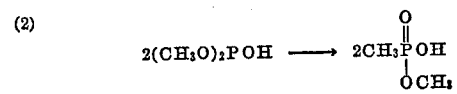

(3) 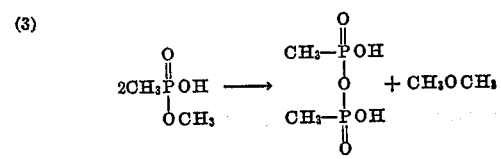

(4) 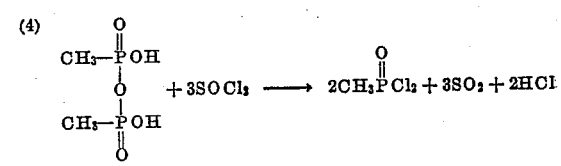

The organic phosphonic acid formed by the reaction represented by Equation 3 is separated and is then reacted with thionyl chloride in accordance with the representative Equation 4.

It is an object of this invention to provide a cheaper and more direct method of producing organic phosphonyl halides.

Another object of this invention is to provide a method for producing methane phosphonyl dichloride in relatively high yields with high selectivity.

Still another object is to produce an organic phosphonyl halide with the minimum of by-products and with the maximum utilization of reactants.

Various other objects and advantages of the present invention will become apparent to those skilled in the art from the accompanying description and disclosure.

In accordance with this invention an organic phosphonyl halide having the general formula $$R-\overset{O}{\underset{\|}{P}}-X_2$$

where R is an organic radical, preferably an alkyl or cycloalkyl radical including the substituted radicals, such as an aralkyl radical or a halogen substituted alkyl or cycloalkyl radical, and X is any of the halogens and the X's may be the same or different halogen atoms, is produced by directly reacting a phosphorous trihalide, having halogens corresponding to the halogens of the desired product; at an elevated temperature with an organic compound of the formula: R—O—R' in which R is an organic radical and is the same as the R of the general formula for the organic phosphonyl halide and R' is a radical containing an organic group. Mixtures of such organic compounds may be reacted with the phosphorous trihalide without departing from the scope of this invention. The organic phosphonyl halide produced may be recovered directly from the reaction mixture by conventional methods, such as distillation, or may be reacted with other compounds to form derivatives thereof and the derivative recovered.

Various phosphorous trihalides may be employed, such as phosphorous trifluoride, phosphorous trichloride, phosphorous tribromide, phosphorous triiodide and the mixed phosphorous trihalides, such as fluoro phosphorous dichloride, difluoro phosphorous chloride, fluoro chloro phosphorous bromide, dichloro phosphorous iodide and dichloro phosphorous bromide. The particular phosphorous trihalide employed depends upon the ultimate product desired. When producing an organic phosphonyl dichloride, phosphorous trichloride is preferred.

The organic compounds of the formula R—O—R' to be reacted with the phosphorous halide include the ethers, esters, acetals and ketals, and are preferably those compounds in which R is an alkyl or cycloalkyl radical having not more than 8 carbon atoms and in which R' is an organic radical having not more than 8 carbon atoms. The R radical has a continuous carbon skeleton, i.e. it is a radical in which the base carbon atoms are bonded directly to one another, the carbon atoms of the carbon skeleton being singly bonded to various monovalent groups such as hydrogen, halogen, nitro and cyano groups. R' may be of the same class and type of radicals as R, or R' may be of a different class of radicals. Thus, R' may also be a radical having a continuous carbon skeleton in which the carbon atoms are singly bonded to various monovalent groups such as hydrogen, halogen, nitro and cyano radicals. When R and R' are of the same class of radicals, R and R' may be the same radical as in the simple symmetrical ethers, or R and R' may be different radicals as in the simple unsymmetrical ethers. When R and R' are of the same class of radicals as in the simple ethers, a mixture of organic phosphonyl halides is usually obtained in which the groups corresponding to the R and R' groups of the starting material are bonded to phosphorous.

As indicated above, the definition of R' includes radicals which are of a different class than those defined for R. Thus, R' also may be an organic radical in which two of its base carbon atoms are separated by an atom of oxygen as in the polyethers, acetals and ketals and certain types of esters as the ortho esters. R' also may contain one or more carbon atoms which are doubly bonded to oxygen as in the monoesters and polyesters which contain a carbonyl group (C=O).

The preferred organic ethers are selected from the group consisting of the alkyl and cycloalkyl ethers including the substituted alkyl ethers such as aralkyl ethers. Examples of ethers are the simple symmetrical ethers such as dimethyl ether, diethyl ether, dipropyl ether, di-n-butyl ether, diisoamyl ether, dihexyl ether, dioctyl ether, dicyclohexyl ether and dibenzyl ether. Such symmetrical ethers are the preferred type of either reactant to be employed since they result in a maximum yield of the corpersopnding organic phosyhonyl halide. Also to be employed are the unsymmetrical ethers, typical examples of which are: methyl ethyl ether, methyl n-butyl ether, ethyl n-butyl ether, ethyl n-propyl ether, methyl t-butyl ether, and methyl benzyl ether. When an unsymmetrical ether is employed, mixed products corresponding to the different alkyl or cycloalkyl radicals of the ether are obtained and generally the alkyl group of shorter chain length attaches to the phosphorus to become an element of the main organic phosphonyl dihalide produced as a product of the process. Thus when an unsymmetrical methyl ether such as methyl propyl ether is interacted with phosphorus trichloride, for example, a mixture of products is obtained, one component of which is methane phosphonyl dichloride.

Various substituted ethers may also be employed, such as the halo, nitro and cyano substituted ethers, for example: beta, beta-dichloro diethyl ether; chloromethyl ether; beta, beta-oxy diproprionitrile; and 2-nitropropyl methyl ether. Instead of using simple ethers containing only one ether linkage, poly ethers, such as polyoxymethylene, polyoxyethylene and polyoxypropylene alcohols may be employed in this invention.

Examples of the esters include the mono esters, the polyesters and the ortho esters. Preferred monoesters are: methyl formate, methyl acetate, butyl acetate, phenyl acetate, benzyl acetate and methyl propionate. Suitable ortho esters include trimethyl ortho formate, trimethyl ortho acetate and trimethyl ortho benzoate. Examples of polyesters are: dimethyl oxalate, dimethyl phthalate and dimethyl adipate. Other esters include the polyesters of inorganic acids, such as dimethyl sulfate, diethyl sulfate, trimethyl borate, tributyl borate and triethyl phosphate.

Such esters can be formed by reacting an acid with an alcohol according to general esterification principles. When employing an ester as a reactant in accordance with this invention, the organic radical derived from the alcohol used to form the ester, preferentially becomes bonded to phosphorus and becomes an element of the main product of the reaction. For example, when a monoester having the formula

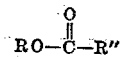

is reacted with PCl₃ as described herein, the R group of the alcohol portion of the ester becomes attached to phosphorus to produce as a main product of reaction

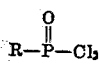

wherein R in the ester reactant and the product are the same and are as above-defined. The carbonyl-containing portion

of such an ester represents the R' radical of the R—O—R' reactant and usually it is not found as an element in the main product of reaction.

Suitable acetals include dimethyl formal, diethyl formal, dimethyl acetal, and diethyl benzal. When an acetal having the formula

is employed as a reactant, the R″OCH₂— radical represents the R' radical of the R—O—R' reactant and the R group preferentially becomes bonded to phosphorus. Thus, for example, when dimethyl formal

is interacted with a phosphorus halide as described herein, the main product of reaction is a methane phosphonyl dihalide.

Examples of ketals for use in this invention are: dimethyl ketal of acetone and cyclohexanone. When such methyl ketals are employed, the main product of reaction is a methane phosphonyl dihalide, the reaction taking place in much the same manner as that described above for the esters and acetals.

A typical equation representing the reaction of this invention is shown below:

(5)

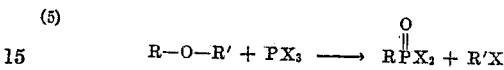

where R and R' are organic radicals as previously discussed, and X is a halogen atom.

The above reaction is carried out preferably at a temperature above about 100° C. and below the decomposition temperature of the reactants. Generally the temperature will be below about 500° C. The reaction is preferably carried out in the liquid phase and this is accomplished by employing sufficient pressure to maintain the reactants in liquid phase condition in the reaction zone at the temperature employed. The process is preferably carried out at an elevated pressure ranging from about 300 to about 3500 p.s.i absolute or higher and is usually effected at a pressure between about 500 and 3,000 p.s.i. In order to obtain the desired elevated pressure, the reaction zone may be pressured with an inert gas such as nitrogen until the desired pressure is obtained. Conveniently, the reaction is carried out under autogenous conditions of pressure in a suitable reaction vessel such as a steel bomb. The preferred temperature range for liquid phase operations at elevated pressures is a temperature between about 175° C. and about 325° C.

Methane phosphonyl dihalide is produced by the following reaction under the above preferred reaction conditions:

(6)

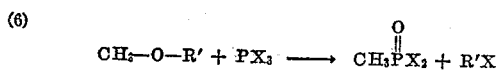

wherein CH₃—O—R' is used to represent a methyl ether, a methyl ester, a methyl acetal, and a methyl ketal and wherein the methyl group becomes bonded to phosphorus to form the main organic phosphonyl halide product of the process. The methane phosyhonyl dihalide is separated from the reaction mixture by distillation.

The reaction may be carried out with or without the presence of catalysts, promoters or initiators. Catalysts which are beneficial in affecting the reaction are those of the Friedel-Crafts type, such as aluminum chloride, aluminum bromide, stannic chloride, zinc chloride, boron trifluoride and hydrogen fluoride. When a catalyst is employed, preferably it is employed in an amount from 0.01 mole to about 2 moles per mole of phosphorus halide. The use of a Friedel-Crafts catalyst such as aluminum chloride leads to higher yields of desired product as compared to the yields obtained under the same reaction conditions when a catalyst is not employed. Another advantage derived from the use of such a catalyst is that it allows for the production of desired product at a temperature which is from about 10 degrees to about 25 degrees lower than the temperature required to obtain comparable yields of product in the absence of a catalyst.

The ratio of phosphorus halide and organic reactant may be varied over relatively wide limits but it is preferable to employ a slight excess of the organic reactant. Similarly, the time of reaction may vary over relatively wide limits, such as one minute to about 12 hours, with a reaction time of at least 0.5 hour being preferred.

The exact mechanism of the reaction is not known. It is postulated, without limiting the invention, however, that the reaction mechanism may be written as follows:

(7) 
ROR' + PX₃ ⟶ RPOX₂ + R'X (8) 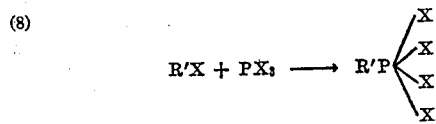
R'X + PX₃ ⟶ R'P(X)(X)(X)(X)

(9) 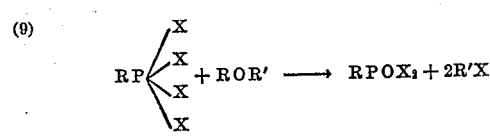
RP(X)(X)(X)(X) + ROR' ⟶ RPOX₂ + 2R'X

In view of the above concept, it is, therefore, desirable to initiate the reaction with a small amount of an alkyl halide which acts as an initiator according to the above equations.

The organic halide (R'X) formed by the reaction may be utilized in the process by separately reacting the R'X with an alcohol (ROH) to produce the organic reactant ROR' and hydrogen halide. The organic reactant (ROR') is recovered from hydrogen halide by conventional methods for reuse, and the hydrogen halide may be used in making the phosphorous halide reactant.

The reaction may be carried out in continuous or batchwise systems without departing from the scope of this invention. The reaction may also be effected in the presence of liquid diluents in which the reactants are dissolved or are dispersed, for example, as an emulsion.

The products of reaction are separated and recovered by conventional techniques. The organic phosphonyl dihalide may be recovered directly from the reaction mixture or it may be hydrolyzed to the corresponding phosphonic acids which may be then converted to various ester derivatives or the phosphonyl dihalide may be converted directly to a desired type ester or other derivatives by conventional methods and the derivatives recovered as the product of the process. The products are identified by the usual methods such as determination of boiling point and other such physical properties, determination of infrared absorption analysis, percent composition analysis, and mass spectrometer analysis.

The following examples are offered as a better understanding of the present invention and of the reaction of phosphorous trichloride with dimethyl ether to produce methane phosphonyl dichloride, but the examples are not to be considered as unnecessarily limiting to the present invention.

*Example 1*

A 200 ml. steel pressure bomb was cooled in a Dry Ice and acetone bath and charged with 68.7 grams (0.5 mole) of phosphorous trichloride and 23 grams (0.5 mole) of dimethyl ether. The bomb was then closed, placed in the reciprocating shaker and heated gradually to 250° C. and held at this temperature for 2¼ hours. The pressure increased to about 2200 p.s.i. After cooling to 0° C. the pressure was released. The off gas contained some unreacted dimethyl ether and appreciable amounts of methyl chloride. The residual liquid was then transferred to a distillation flask and distilled at atmospheric pressure. After removing unreacted phosphorous trichloride, an impure fraction boiling at 110–165° C. was obtained. This fraction contained a substantial amount of methane phosphonyl dichloride.

*Example 2*

Example 1 was repeated except that 1.33 grams (0.01 mole) of anhydrous aluminum chloride was added as a catalyst and the reaction time at 250° C. was extended to 6¼ hours. Distillation of the residual liquid after cooling and releasing the pressure gave a fraction boiling at 79.5–80.5° C. at 40 mm. mercury pressure and a second fraction boiling up to 80° C. at 20 mm. mercury pressure.

This first fraction solidified at 29.5–33° C. and contained 53.25 percent chlorine. Methane phosphonyl chloride is reported to melt at 32° C., and requires 53.32 percent chlorine. The methane phosphonyl dichloride was further characterized by hydrolysis to methane phosphonic acid M.P. .02–105.5° C. A mixed melting point with a pure sample of methane phosphonic acid showed no depression of the melting point.

By employing the procedures similar to those of Examples 1 and 2, methane phosphonyl dichloride also is obtained in substantial yield (i.e. in a yield of at least 5 percent) by interacting phosphorus trichloride with dimethyl sulfate, dimethyl acetal of acetone and dimethyl acetal.

Although the above examples describe the preparation of methane phosphonyl dichloride, other organic phosphonyl halides may be prepared similarly by the reaction of this process. Thus, for example, when dibutyl ether is reacted with phosphorus tribromide at a temperature of about 275° C. under autogenous pressure, butane phosphonyl dibromide is obtained in substantial yield. Further when about equimolar amounts of phosphorus trichloride and ethyl propionate are interacted at a temperature of about 250° C. for a time of about 5 hours, ethane phosphonyl dichloride is produced in substantial yield.

Although the invention has been described with relation to specific reaction conditions and operating techniques, various modifications and alterations may become apparent to those skilled in the art without departing from the scope of this invention.

Having described my invention, I claim:

1. A process for the production of an organic phosphonyl halide which comprises reacting a phosphorous trihalide with an organic compound of the formula R—O—R' where R is a radical having not more than 8 carbon atoms selected from the group consisting of an alkyl and a cycloalkyl radical and R' is a radical having not more than 8 carbon atoms selected from the group consisting of an alkyl radical, a —CH₂—O-alkyl radical, a

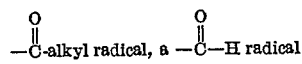
$$-\overset{O}{\underset{\|}{C}}\text{-alkyl radical, a } -\overset{O}{\underset{\|}{C}}-H \text{ radical}$$

and an —SO₂O-alkyl radical, at a temperature of at least 175° C. to produce an organic phosphonyl halide having a continuous carbon skeleton, and recovering said organic phosphonyl halide as a product of the process.

2. A process for the production of an organic phosphonyl halide which comprises reacting a phosphorous trihalide with a compound of the formula R—O—R' where R is a radical having not more than 8 carbon atoms selected from the group consisting of an alkyl and a cycloalkyl radical and R' is a radical having not more than 8 carbon atoms selected from the group consisting of an alkyl radical, a —CH₂—O-alkyl radical, a

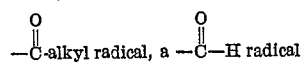
$$-\overset{O}{\underset{\|}{C}}\text{-alkyl radical, a } -\overset{O}{\underset{\|}{C}}-H \text{ radical}$$

and an —SO₂O-alkyl radical, at a temperature between about 175° C. and about 500° C. to produce an organic phosphonyl halide of the formula

$$R-\overset{O}{\underset{\|}{P}}-X_2$$

in which X is a halogen atom, and recovering said organic phosphonyl halide as a product of the process.

3. The process of claim 2 in which the reaction is effected in the presence of a Friedel-Crafts type catalyst.

4. The process of claim 2 in which the reaction is effected in the absence of a catalyst.

5. A process for the production of an organic phosphonyl halide which comprises reacting a phosphorous trihalide with a compound of the formula R—O—R' where R is a radical having not more than 8 carbon atoms selected from the group consisting of an alkyl and a cycloalkyl radical and R' is a radical having not more than 8 carbon atoms selected from the group consisting of an alkyl radical, a —CH₂—O-alkyl radical, a

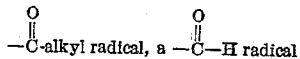
—C-alkyl radical, a —C—H radical and an —SO₂O-alkyl radical, at a temperature between about 175° C. and about 325° C. under liquid phase conditions to produce an organic phosphonyl halide of the formula

R—P—X₂ in which X is a halogen atom, and recovering said organic phosphonyl halide as a product of the process.

6. A process for the production of an organic phosphonyl halide which comprises reacting a phosphorous trihalide with an alkyl ether in which each alkyl group bonded to ether oxygen has not more than 8 carbon atoms, at a temperature between about 175° and about 500° C. to produce an organic phosphonyl halide having the formula

R—P—X₂ in which X is a halogen atom and R is an alkyl radical having not more than 8 carbon atoms, and recovering said organic phosphonyl halide as a product of the process.

7. A process for the production of a methane phosphonyl halide which comprises reacting a phosphorous trihalide with an organic compound of the formula CH₃—O—R' where R' is a radical having not more than 8 carbon atoms selected from the group consisting of an alkyl radical, a —CH₂—O-alkyl radical, a

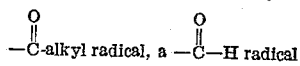
—C-alkyl radical, a —C—H radical and an —SO₂O-alkyl radical, at a temperature above 175° C. in the presence of a Friedel-Crafts catalyst to produce a methane phosphonyl halide of the general formula CH₃P(O)X₂ where X is a halogen atom, and recovering said methane phosphonyl halide as a product of the process.

8. A process for the production of a methane phosphonyl halide which comprises reacting a phosphorous trihalide with dimethyl ether at a temperature between about 175° C. and about 325° C. to produce the corresponding methane phosphonyl halide, and recovering the methane phosphonyl halide thus produced as a product of the process.

9. A process for the production of a methane phosphonyl halide which comprises reacting a phosphorous trihalide with an ester of the formula

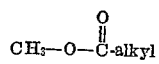
CH₃—O—C-alkyl wherein the alkyl group has not more than 8 carbon atoms at a temperature between about 175° C. and about 500° C. to produce a methane phosphonyl halide having the general formula

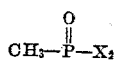
CH₃—P—X₂ in which X is a halogen atom, and recovering said methane phosphonyl halide as a product of the process.

10. A process for the production of a methane phosphonyl halide which comprises reacting a phosphorous trihalide with methyl acetate at a temperature between about 175° C. and about 325° C. to produce a methane phosphonyl halide, and recovering the methane phosphonyl halide thus produced as a product of the process.

11. A process for the production of a methane phosphonyl halide which comprises reacting a phosphorous trihalide with dimethyl sulfate at a temperature between about 175° C. and about 325° C. to produce a methane phosphonyl halide, and recovering the methane phosphonyl halide thus produced as a product of the process.

12. A process for the production of a methane phosphonyl halide which comprises reacting a phosphorous trihalide with dimethyl ketal of acetone at a temperature between about 175° C. and about 325° C. to produce a methane phosphonyl halide, and recovering the methane phosphonyl halide thus produced as a product of the process.

13. A process for the production of a methane phosphonyl halide which comprises reacting a phosphorous trihalide with dimethyl acetal at a temperature between about 175° C. and about 325° C. to produce a methane phosphonyl halide, and recovering the methane phosphonyl halide thus produced as a product of the process.

14. A process for the production of an alkyl phosphonyl dihalide which comprises reacting phosphorous trihalide with an alkyl ether containing only one ether linkage in which each alkyl radical has not more than eight carbon atoms at a temperature between about 175° C. and about 325° C. to produce an alkyl phosphonyl dihalide, and recovering said alkyl phosphonyl dihalide as a product of the process.

15. A process for the production of methane phosphonyl dichloride which comprises reacting phosphorous trichloride with dimethyl ether at a temperature between about 175° C. and about 325° C. under autogenous conditions such that methane phosphonyl dichloride is produced, and recovering the methane phosphonyl dichloride as a product of the process.

16. The process of claim 15 in which the reaction is effected in the presence of aluminum chloride as a catalyst.

17. A process for the production of an organic phosphonyl halide which comprises reacting phosphorous tribromide with an organic compound of the formula R—O—R' where R has a continuous carbon skeleton of not more than 8 carbon atoms and is selected from the group consisting of an alkyl and a cycloalkyl radical and R' is a radical having not more than 8 carbon atoms selected from the group consisting of an alkyl radical, a —CH₂—O-alkyl radical, a

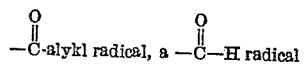
—C-alkyl radical, a —C—H radical and an —SO₂O-alkyl radical, at a temperature between about 175° C. and about 325° C. to produce an organic phosphonyl halide having a continuous carbon skeleton of not more than 8 carbon atoms, and recovering the organic phosphonyl halide as a product of the process.

18. A process for the production of an organic phosphonyl halide which comprises reacting fluoro phosphorous dichloride with an organic compound of the formula R—O—R' where R has a continuous carbon skeleton of not more than 8 carbon atoms and is selected from the group consisting of an alkyl and a cycloalkyl radical and R' is a radical having not more than 8 carbon atoms selected from the group consisting of an alkyl radical, a —CH₂—O-alkyl radical, a

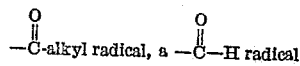
—C-alkyl radical, a —C—H radical and an —SO₂O-alkyl radical, at a temperature between about 175° C. and about 325° C. to produce an organic phosphonyl halide having a continuous carbon skeleton of not more than 8 carbon atoms, and recovering the organic phosphonyl halide as a product of the process.

19. A process for the production of an organic phosphonyl halide which comprises reacting fluoro chloro phosphorous bromide with an organic compound of the formula R—O—R' where R has a continuous carbon skeleton of not more than 8 carbon atoms and is selected from the group consisting of an alkyl and a cycloalkyl radical and R' is a radical having not more than 8 carbon atoms selected from the group consisting of an alkyl radical, a —CH₂—O-alkyl radical, a

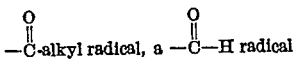

and an —SO₂O-alkyl radical, at a temperature between about 175° C. and about 325° C. to produce an organic phosphonyl halide having a continuous carbon skeleton of not more than 8 carbon atoms, and recovering the organic phosphonyl halide as a product of the process.

20. A process for the production of an organic phosphonyl halide which comprises reacting dichloro phosphorous bromide with an organic compound of the formula R—O—R' where R has a continuous carbon skeleton of not more than 8 carbon atoms and is selected from the group consisting of an alkyl and a cycloalkyl radical and R' is a radical having not more than 8 carbon atoms selected from the group consisting of an alkyl radical, a —CH₂—O-alkyl radical, a

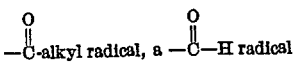

and an —SO₂O-alkyl radical, at a temperature between about 175° C. and about 325° C. to produce an organic phosphonyl halide having a continuous carbon skeleton of not more than 8 carbon atoms, and recovering the organic phosphonyl halide as a product of the process.

References Cited in the file of this patent
UNITED STATES PATENTS 2,500,022        Brown _____ Mar. 7, 1950

UNITED STATES PATENT OFFICE

CERTIFICATE OF CORRECTION

Patent No. 2,882,316                                                              April 14, 1959

William E. Hanford

It is hereby certified that error appears in the printed specificati of the above numbered patent requiring correction and that the said Lette Patent should read as corrected below.

Column 6, line 6, for ".02-105.5° C." read -- 102-105.5° C. --.

Signed and sealed this 13th day of October 1959.

(SEAL)
Attest:
KARL H. AXLINE
Attesting Officer

ROBERT C. WATSO
Commissioner of Paten